United States Patent
Chase et al.

[15] 3,686,868
[45] Aug. 29, 1972

[54] ROCKET MOTORS

[72] Inventors: Michael John Chase, Sunglen, Stanklyn Lane, Summerfield; Derek Anthony Smith, 209 Wymering Rd., London, both of England

[22] Filed: Dec. 19, 1968

[21] Appl. No.: 785,458

[52] U.S. Cl. ............ 60/200 A, 102/DIG. 8, 102/103, 260/41 B
[51] Int. Cl. ............................... F02k 9/04
[58] Field of Search ......... 102/103, 38; 260/41, 41 A, 260/41 B; 60/253, 39.47, 200

[56] References Cited

UNITED STATES PATENTS

| 3,054,258 | 9/1962 | Marti, Jr. | 60/253 X |
| 3,056,260 | 10/1962 | Mosher | 60/253 |
| 3,247,158 | 4/1966 | Alford et al. | 260/41 A |
| 3,347,047 | 10/1967 | Hartz et al. | 102/103 X |
| 3,403,626 | 10/1968 | Jacobson et al. | 102/38 |
| 3,475,546 | 10/1969 | Sadler | 260/41 B |

*Primary Examiner*—Samuel W. Engle
*Attorney*—Cushman, Darby & Cushman

[57] ABSTRACT

An elastomer-containing compound suitable for use in the lining of rocket motor cases comprising 100 parts by weight elastomer and, inter alia, 20–80 parts by weight of at least one metal halide having a boiling point above 500° C and developing a significant vapor pressure between 500 and 1,200° C. The metal halide is typically lead chloride.

7 Claims, 1 Drawing Figure

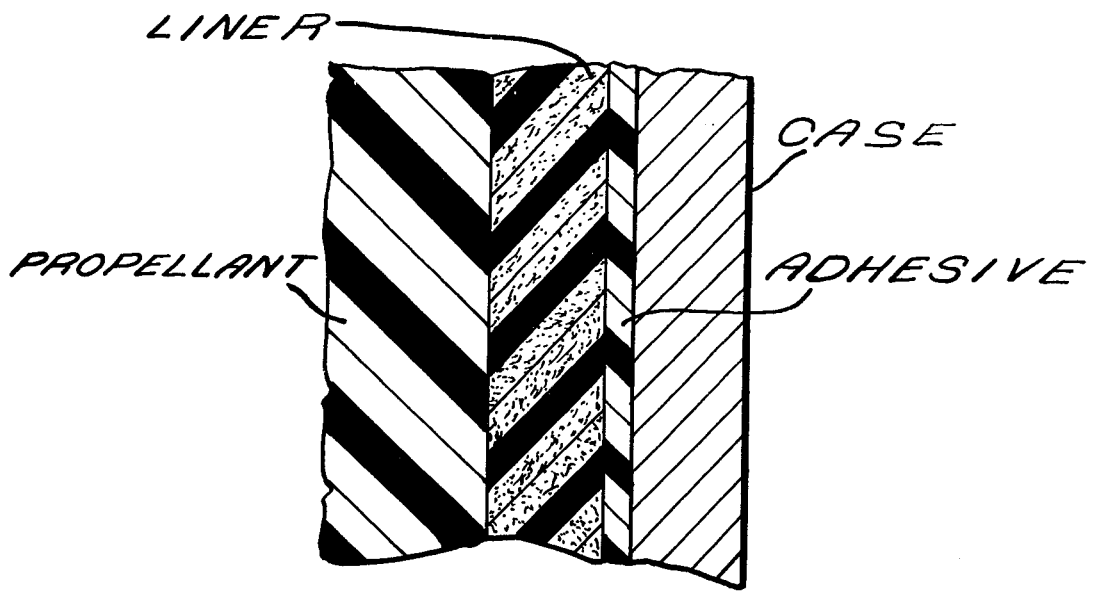

ROCKET MOTORS

BACKGROUND OF THE INVENTION

This invention relates to rocket motors and is particularly concerned with elastomer-containing compounds for liners for rocket motor cases. The invention is especially concerned with the liners of case bonded solid propellant rocket motors.

When a rocket motor is fired, very high temperature and extreme erosive conditions are developed in its combustion chamber such that the case of the motor rapidly fails unless it is protected from these conditions. Hence rocket motor cases are usually provided with liners for protection, and these are conventionally based on a compound of an elastomer with fillers. However, even this compound itself is thermally degraded in time, so that to avoid having to be of excessive thickness, the liner needs to include materials which, as alternative purposes, either slow down the rate of loss of liner compound, or provide some protection when substantially all of the elastomer content has burnt away, or a combination of materials for both purposes. For the latter of the alternative purpose, asbestos and other fillers have been used as part of the fillers but the present invention is particularly concerned with the former of these alternatives.

Accordingly, it is an object of the present invention to provide an elastomer-containing compound for use as a liner in rocket motors, the compound being capable of protecting itself to some degree from loss during the firing of the rocket motor.

SUMMARY OF THE INVENTION

In accordance with the invention, an elastomer-containing compound suitable for use in the lining of rocket motor cases comprises 100 parts by weight of elastomer, 40–100 parts by weight of filler material, and 20–80 parts by weight of at least one metal halide having a boiling point above 500° C and developing a significant vapor pressure between 500–1200° C, and which is compatible with the other contents of the elastomer-containing compound.

The word "compatible" as used in this specification means that the metal halide does not react to any substantial degree with the other contents of the elastomer-containing compound, or that any such reaction is not deleterious, and that the physical properties of the elastomer-containing compound are not degraded to an unacceptable degree by the addition of the metal halide.

Preferably the metal halide is lead chloride.

In accordance with the invention also a case-bonded rocket motor case includes a liner comprising a cured elastomer-containing compound comprising 100 parts by weight of elastomer, 40–100 parts by weight of filler material, and 20–80 parts by weight of at least one metal halide having a boiling point above 500° C and developing a significant vapor pressure between 500°–1200° C, and which is compatible with the other contents of the cured elastomer-containing compound.

DESCRIPTION OF THE PREFERRED EMBODIMENTS

In a typical embodiment of the invention, an elastomer-containing compound is produced for use as liner material for the case of a case-bonded solid propellant rocket motor by mixing together 97 parts by weight of elastomer obtainable under the Trade Mark "Shell ECP 900," and 3 parts of the elastomer "Hypalon 40." The "Shell ECP 900" is a terpolymer of ethylene, propylene and dicyclopentadiene and contains 60 percent ±1 by weight of ethylene, 1.8 percent ±1 by weight of dicyclopentadiene and the balance is propylene. The dicyclopentadiene is a diene containing unsaturated linkages of unequal reactivity. The "Hypalon 40" is a chlorosulphonated polyethylene.

The elastomers are mixed together with 60 parts of "Manosil VN3" which is a finely divided silica powder, and 50 parts of lead chloride. The silica powder acts as a reinforcing filler material, and the function of the lead chloride is described below. The lead chloride is compatible with the other contents of the elastomer-containing compound.

Various plasticizers, curing agents and accelerators are added to the mix and in this embodiment there are provided 8 parts of triethanolamine, 10 parts of pale liquid "Coumarone" resin (0.1 percent acidity) which is obtainable from Anchor Chemicals Limited, 5 parts zinc oxide, 2.5 parts sulphur, 3.75 parts dibenzthiazyl disulphide, 1.25 parts di-phenyl guanidine, and 1.0 part stearic acid. During the mixing process, the triethanolamine and silica are mixed together and well into the elastomer and lead chloride content before addition of the sulphur and the accelerator.

After thorough mixing, the elastomer-containing compound is applied to the cleaned interior of the case of a solid rocket motor in the form of sheet, and is held in position by use of an adhesive such as "Redux 775" available from Bonded Structures Limited. As an alternative, the composition can be moulded and then bonded into the interior of the rocket motor case.

The composition is then cured under pressure for about 40 minutes at 160° C. The pressure can range between that applied by a vacuum bag, i.e. of the order of 10–14 psi, to that obtainable by matched dies, i.e. of the order of 10,000 psi. The temperature and time can also be varied, 15 minutes to 2 hours generally being used for 170° C–130° C.

The liner so produced is found experimentally in insulate the case in a surprisingly efficient manner, the lead chloride reducing the transmission of heat from the interior of the motor to the liner at least partly by the barrier effect of the heavy volatiles of lead chloride moving in a relatively slow stream along the surface of the liner after release from the liner.

In modifications of the typical embodiment, the lead chloride content can vary from 20–80 parts, preferably 20–60 parts, and can be replaced at least partially by other metal halides having a boiling point above 500° C and developing a significant vapor pressure between 500°–1200° C, and which are compatible with the other contents of the elastomer-containing compound.

Also, other filler materials, for example, asbestos, can be used in addition to or replacement of silica powder.

In addition, the elastomeric composition described above can be varied in various ways, in particular the terpolymer can be modified by the use of methyl-tetrahydro-indene instead of the dicyclopentadiene. To make this modification, in place of the "Shell ECP 900," there is used the terpolymer available from E.I. Du Pont de Nemours & Co., under the Trade Mark "Nordel 1070."

Alternatively, dicyclopentadiene can well be used as the termonomer but the rubber is that available from the US Rubber Company under the Trade Mark "Royalene 301." In a still further alternative "Royalene 501" may be used. In addition, the terpolymer can be varied from the 97 parts within the range 75–100, the "Hypalon" content varying in consequence between 25–0 parts.

The terpolymers described above produce a low density liner, but if density is relatively unimportant, it may be possible to substitute for them nitrile rubbers, neoprene rubbers, chlorosulphonated polyethylene rubbers, styrene-butadiene rubbers, butyl rubbers, polyurethane rubbers, silicone and other rubbers. Polyisoprene rubbers and ethylene-propylene copolymer rubbers may also be used.

In further modifications, the triethanolamine is replaced by "Carbowax 6000" which is a polyethylene glycol available from Union Carbide Corporation, in which case only 1–5 parts are normally used. Also the accelerator system of 3.75 parts of dibenzthiazyl disulphide, 1.25 parts di-phenyl guanidine and 1.0 part of stearic acid can be replaced by 1.0 part of mercapto-benz-thiazole, 1.5 parts of tetramethyl thiurum disulphide and 1.25 parts of zinc di-ethyl dithiocarbonate.

What is claimed is:

1. A rocket motor case having an insulating liner bonded to the inner surface of the case, said liner comprising 100 parts by weight of elastomer, 40–100 parts by weight of filler material, and 20–80 parts by weight of lead chloride.

2. A compound according to claim 1 containing 20–60 parts by weight of said lead chloride.

3. A compound according to claim 2 containing 50 parts by weight of said lead chloride.

4. A compound according to claim 1 wherein said 100 parts by weight of elastomer consists of 75–100 parts by weight of a terpolymer of ethylene and propylene and a diene containing unsaturated linkages of unequal reactivity and 25–0 parts by weight of a chlorosulphonated polyethylene.

5. A compound according to claim 4 wherein the terpolymer of ethylene and propylene is a terpolymer of ethylene and propylene with dicyclopentadiene.

6. A compound according to claim 4 wherein the terpolymer of ethylene and propylene is a terpolymer of ethylene and propylene with methyl-tetra-hydro-indene.

7. A compound according to claim 1 wherein said 40–100 parts by weight of filler material is about 60 parts by weight of silica powder.

* * * * *

UNITED STATES PATENT OFFICE
CERTIFICATE OF CORRECTION

Patent No. 3686868           Dated August 29, 1972

Inventor(s) Michael John CHASE and Derek Anthony SMITH

It is certified that error appears in the above-identified patent and that said Letters Patent are hereby corrected as shown below:

Add to the heading:

--- Applicants claim priority of British application No. BR. 59195/67, filed December 29, 1967. ---

--- Assigned to Imperial Metal Industries (Kynoch) Limited and Derek Anthony Smith and recorded July 25, 1972 on Reel 2869, Frame 342. ---

Signed and sealed this 6th day of February 1973.

(SEAL)
Attest:

EDWARD M. FLETCHER, JR.　　　　　　　ROBERT GOTTSCHALK
Attesting Officer　　　　　　　　　　　Commissioner of Patents